G. H. HAMMOND.
WAGON BRAKE ACTUATING MEANS.
APPLICATION FILED APR. 22, 1918.
1,288,876.
Patented Dec. 24, 1918.
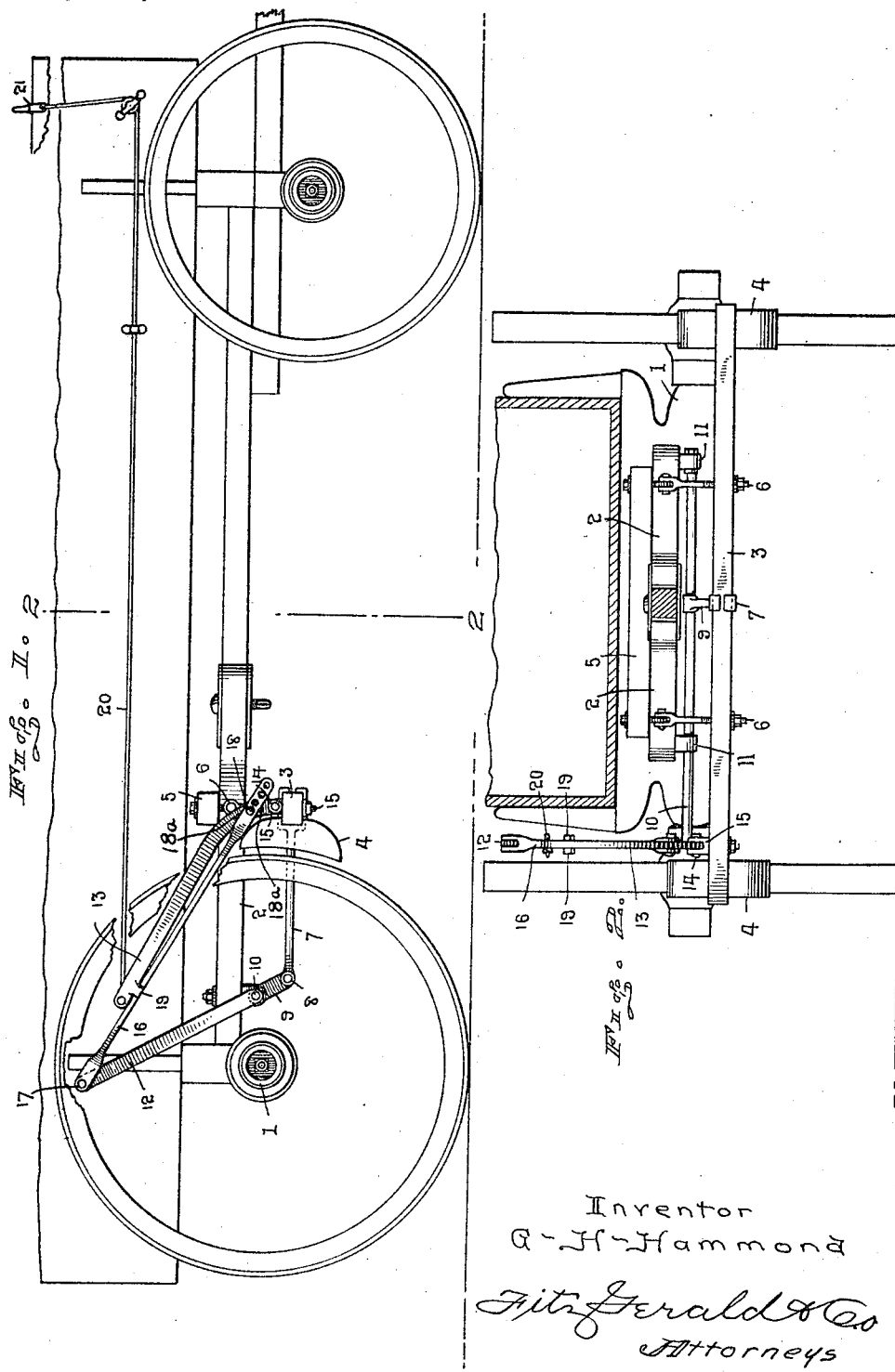
Inventor
G. H. Hammond
Fitz Gerald & Co.
Attorneys

UNITED STATES PATENT OFFICE.

GEORGE H. HAMMOND, OF SPOKANE, WASHINGTON.

WAGON-BRAKE-ACTUATING MEANS.

1,288,876.  Specification of Letters Patent.  Patented Dec. 24, 1918.

Application filed April 22, 1918. Serial No. 229,974.

*To all whom it may concern:*

Be it known that I, GEORGE H. HAMMOND, a citizen of the United States, residing at Spokane, in the county of Spokane and State of Washington, have invented certain new and useful Improvements in Wagon-Brake-Actuating Means; and I do hereby declare the following to be a full, clear, and exact description of the invention, such as will enable others skilled in the art to which it appertains to make and use the same.

The main object of the invention is to provide means for multiplying and increasing the ordinary brake leverage to more effectively and reliably apply the brakes.

A further object of the invention is to provide lever actuating mechanism supported by the brake beam and pivotally connected to the free end of the ordinary brake lever whereby the brake leverage may be multiplied and increased.

A further object of the invention is to provide brake lever actuating mechanism which is of simple and inexpensive construction and which can be quickly and readily applied in operative position.

With these and other objects in view as will appear as the description proceeds, the invention comprises the various novel features of construction, combination and arrangement of parts as will be fully described hereinafter and afterward specifically claimed.

Referring to the drawings:

Figure 1 represents a side elevation of my improved brake actuating mechanism operatively associated with the ordinary wagon brake lever, and Fig. 2 represents a transverse sectional view taken on a plane indicated by the line 2—2 of Fig. 1.

Similar characters of reference are used to denote like parts throughout the accompanying drawings and the following description.

In order that the construction and operation of the invention may be readily comprehended by those skilled in the art to which the invention relates, I have illustrated an approved embodiment thereof in the accompanying drawings, and will now proceed to fully describe the same in connection with said drawings, in which 1 is the rear axle, 2 the hounds, 3 the brake beam, 4 the brake shoe, 5 the supporting bar, and 6 the suspension links for the brake beam, all of said parts being standard and well known in the usual wagon running gear.

7 indicates a rod which has one end rigidly attached to the brake beam 3 and its other end pivotally connected as at 8 to an arm 9 rigid on the rock shaft 10. The shaft 10 is journaled in bearings 11 attached to the under sides of the hounds 2, and has rigidly attached to one end the ordinary brake lever 12. The parts just described constitute the usual brake mechanism of an ordinary wagon running gear.

My novel construction of brake mechanism is shown to consist of an actuating lever 13, the lower end of which is curved and pivotally connected as at 14 to a bracket member 15 detachably connected to the brake beam 3. 16 indicates a link, one end of which is pivotally connected as at 17 to the free end of the brake lever 12 while the other end is pivotally and adjustably connected as at 18 to the actuating lever 13 adjacent its pivot 14. Apertures 18ª are provided in the curved end of the lever 13 whereby the fulcrum or pivot 18 can be adjusted to or from the brake shoe to vary the leverage applied to the brake shoe.

The actuating lever 13 is provided adjacent its outer end with a pair of lugs 19 which when the lever is disposed in an operative position are adapted to rest on opposite sides of the link 16 and serve to prevent the lever 13 from dropping down to one side of the link.

In order that the lever 13 may be actuated, I have provided a pull cable 20 which has one end connected to the outer end of the lever 13 and its other end suitably guided forwardly of the running gear to a position within convenient reach of the driver. The forward end of the cable may if desired be attached to a suitable support as at 21 within easy reach of the driver.

By the above described construction of lever actuating mechanism it will be apparent that the ordinary wagon brake leverage can be multiplied and greatly increased and thus more effectively apply the brakes.

Having thus described my invention, what I claim as new, is:—

1. In a wagon running gear, the combination of a brake lever, a brake beam, a rod extending from said beam to said lever, an actuating lever having its lower end pivotally mounted on said brake beam independent of said rod, a link having one end pivotally connected to the free end of said brake lever and its opposite end pivotally connected to said actuating lever adjacent its mounting upon the brake beam, spaced lugs carried by the actuating lever and adapted to embrace said link, and operating connections attached to said actuating lever.

2. In a wagon running gear, the combination with the brake lever and brake beam thereof, of an actuating lever having its lower end pivotally mounted on said brake beam, a link having one end pivotally connected to the upper free end of said brake lever and its other end pivotally and adjustably connected to said actuating lever adjacent its pivotal connection with said brake beam, spaced lugs carried by the upper free end of said actuating lever and adapted to drop on opposite sides of said link to hold the actuating lever on said link when in inoperative position, and a pull cable attached to the upper end of said actuating lever.

In testimony whereof I have signed my name to this specification in the presence of two subscribing witnesses.

GEORGE H. HAMMOND.

Witnesses:
 GEO. E. CANFIELD,
 L. L. WESTFALL.

Copies of this patent may be obtained for five cents each, by addressing the "Commissioner of Patents, Washington, D. C."